(12) United States Patent
Johnson et al.

(10) Patent No.: US 6,619,864 B2
(45) Date of Patent: Sep. 16, 2003

(54) OPTICAL CHANNEL MONITOR WITH CONTINUOUS GAS CELL CALIBRATION

(75) Inventors: Gregg A. Johnson, Fairfax, VA (US); Bryan L. Althouse, Davidsonville, MD (US)

(73) Assignee: Optinel Systems, Inc., Elkridge, MD (US)

( * ) Notice: Subject to any disclaimer, the term of this patent is extended or adjusted under 35 U.S.C. 154(b) by 208 days.

(21) Appl. No.: 09/808,222

(22) Filed: Mar. 15, 2001

(65) Prior Publication Data

US 2002/0131104 A1 Sep. 19, 2002

(51) Int. Cl.[7] ............................................... H04B 10/08
(52) U.S. Cl. ........................................... 398/34; 398/93
(58) Field of Search ................................ 359/110, 124, 359/181; 372/20, 32, 26, 19

(56) References Cited

U.S. PATENT DOCUMENTS

| | | | |
|---|---|---|---|
| 4,589,285 A | 5/1986 | Savit ........................... 73/655 |
| 5,022,730 A | 6/1991 | Cimimi et al. ................. 385/27 |
| 5,208,819 A | 5/1993 | Huber ........................... 372/32 |
| 5,380,995 A | 1/1995 | Udd et al. ............... 250/227.18 |
| 5,392,117 A | 2/1995 | Belleville et al. ........... 356/480 |
| 5,394,415 A | 2/1995 | Zucker et al. ................ 372/26 |
| 5,397,891 A | 3/1995 | Udd et al. ............... 250/227.18 |
| 5,401,956 A | 3/1995 | Dunphy et al. ......... 250/227.18 |
| 5,430,574 A | 7/1995 | Tehrani ...................... 359/378 |
| 5,591,965 A | 1/1997 | Udd ....................... 250/227.18 |
| 5,673,129 A | 9/1997 | Mizrahi ...................... 359/124 |
| 5,680,489 A | 10/1997 | Kersey ......................... 385/12 |
| 5,691,989 A | 11/1997 | Rakuljic et al. .............. 372/20 |
| 5,706,301 A | 1/1998 | Lagerström ................. 372/32 |
| 5,780,843 A | 7/1998 | Cliché et al. ................ 250/226 |
| 5,818,585 A | 10/1998 | Davis et al. ................. 356/477 |
| 5,825,792 A | 10/1998 | Villeneuve et al. ........... 372/32 |
| 5,838,437 A | 11/1998 | Miller et al. ................. 356/478 |
| 5,889,901 A | 3/1999 | Anderson et al. ............. 385/12 |
| 5,892,582 A | 4/1999 | Bao et al. .................... 356/519 |
| 5,915,052 A | 6/1999 | Ball ............................. 384/24 |
| 5,956,355 A | 9/1999 | Swanson et al. .............. 372/20 |
| 5,963,567 A | 10/1999 | Veselka et al. ............... 372/21 |
| 5,982,962 A | 11/1999 | Koops et al. ................. 385/37 |
| 5,987,197 A | 11/1999 | Kersey ........................ 385/24 |
| 5,991,476 A | 11/1999 | Baney et al. ................. 385/16 |
| 5,995,255 A | 11/1999 | Giles .......................... 359/124 |
| 6,008,920 A | 12/1999 | Hendrix ...................... 359/127 |
| 6,044,189 A | 3/2000 | Miller ......................... 385/37 |
| 6,072,567 A | 6/2000 | Sapack ........................ 356/32 |
| 6,097,487 A | 8/2000 | Kringlebotn et al. ........ 356/450 |
| 6,111,681 A | 8/2000 | Mizrahi et al. .............. 359/187 |
| 6,115,122 A | 9/2000 | Bao et al. .................... 356/450 |
| 6,118,530 A | 9/2000 | Bouevitch et al. ........... 356/308 |
| 6,134,003 A | 10/2000 | Tearney et al. .............. 356/450 |
| 6,163,555 A | 12/2000 | Siddiqui et al. .............. 372/32 |
| 6,188,499 B1 | 2/2001 | Majima ....................... 359/193 |
| 6,249,365 B1 | 6/2001 | Mizrahi et al. .............. 359/130 |

FOREIGN PATENT DOCUMENTS

| | | |
|---|---|---|
| DE | 198 45 701 A1 | 4/2000 |
| WO | WO 02/07359 A1 | 1/2002 |

OTHER PUBLICATIONS

Derickson, Dennis, "Fiber Optic Test and Measurement", Hewlett Packard Co., 1998, pp. 95–109.

*Primary Examiner*—Jason Chan
*Assistant Examiner*—Christina Y Leung
(74) *Attorney, Agent, or Firm*—Pillsbury Winthrop LLP (57) ABSTRACT

The invention includes a method and apparatus for monitoring wavelength of an optical channel. A tunable optical bandpass filter is used to correlate a signal from an optical transmission line with a signal from a reference light source. The signal from the reference light source passes through a reference gas cell. The absorption lines of the reference gas provide a known calibration standard against which measured values may be compared. The invention finds applications in optical transmission systems, including wavelength division multiplexed and dense wavelength division multiplexed (WDM and DWDM) optical communication systems.

21 Claims, 8 Drawing Sheets

OPTICAL CHANNEL MONITOR WITH CONTINUOUS GAS CELL CALIBRATION

BACKGROUND

1. Field of Invention

This invention relates generally to methods and devices for measuring characteristics of an optical signal. More particularly, it relates to devices and methods for determining wavelength, power and optical noise of a plurality of optical signals in an optical fiber.

2. General Background and Related Art

In recent years, optical communications systems have become more important in many types of networks. Local area networks, wide area networks, telecommunications systems, CATV (variously used to indicate; community antenna television systems and cable television systems) and other types of systems make use of optical communications technologies.

A somewhat recent development in optical communications systems is the use of wavelength division multiplexed (WDM) systems. Such systems make use of multiple wavelength channels of light carried in a single mode optical fiber to transmit information. Such systems are generally capable of handling a great deal more information than systems employing only a single wavelength channel of light on each fiber.

In general, WDM systems transmit on single mode optical fibers having a low-dispersion window. Currently, more and more wavelength channels are being transmitted within a given bandwidth in the low-dispersion window. A system using such closely packed channels is known as dense WDM (DWDM). In WDM systems, as well as in other types of optical communication systems, it may become necessary to monitor each transmitted channel in order to determine the wavelength and power of each channel and to determine the optical noise intensity near each source wavelength. Such monitoring becomes increasingly important as one increases the number of wavelength channels transmitted through the fiber. The information produced by the monitor may be used, for example, for feedback control of the light source or sources, to control signal quality during environmental changes and reconfigurations of the system, to monitor instability in various components of the system, or to ensure that a selected channel is the correct one.

A limited form of wavelength monitoring is disclosed by Villeneuve et al. in U.S. Pat. No. 5,825,792, herein incorporated by reference. Villeneuve discloses the use of a Fabry-Perot filter disposed within an optical path of the signal to be measured. The filter is positioned at an angle so that different wavelengths of light are transmitted at varying angles with respect to the incoming light. A pair of photodiodes is used to detect light at two pre-selected angles, and the output of the photodiodes is used to provide an electrical signal for feedback control of the light source.

Another approach is disclosed by Mizrahi et al in U.S. Pat. No. 6,111,681, herein incorporated by reference. Mizrahi teaches a method and apparatus for providing a stabilized optical selector. The device of Mizrahi correlates a wavelength of a wavelength selector to a wavelength emitted by an optical transmission source. The optical transmitter includes a wavelength reference which is coupled to a feedback loop. The feedback loop uses thermal control to adjust the output of the transmitter. A tap in the transmission line diverts a portion of the transmitter's energy to a wavelength reference, such as a Bragg grating. A photodiode detects light transmitted through the Bragg grating and provides a feedback signal to a microprocessor which directs the thermal control of the transmitter. Mizrahi et al. likewise disclose the reverse device, providing a feedback loop for thermal or strain control of the reflection wavelength of the Bragg grating, using the laser source as the reference.

Davis et al. (U.S. Pat. No. 5,818,585, herein incorporated by reference) disclose another system for monitoring of reflected wavelengths from multiple strings of fiber Bragg gratings (FBG) using a scanning optical filter and a reference string of FBG elements. As is the case with the device of Mizrahi et al., the reference does not provide an absolute measurement since the FBG references themselves have a dependence on physical parameters such as temperature and strain which may vary over time.

The details of operation of a Fabry-Perot interferometer, and its use as an optical filter can be gleaned from U.S. Pat. 5,392,117 issued to Belleville et al., herein incorporated by reference.

SUMMARY

The present invention provides methods and devices for monitoring optical signals.

An optical channel monitor according to an embodiment of the present invention includes a tunable optical bandpass filter in optical communication with an optical input, a photodetector in optical communication with the optical input, a reference light source in optical communication with the tunable optical bandpass filter, configured and arranged to produce a reference light beam having a bandwidth greater than a passband width of the tunable optical bandpass filter, a reference gas cell containing a reference gas and in optical communication with the reference light source such that at least a portion of the light from the reference light source passes through both of the reference gas cell and the tunable optical bandpass filter and the reference gas has a plurality of known absorption bands.

In one embodiment, the above described optical channel monitor makes use of a single photodetector which selectively or simultaneously receives light from the input optical signal after passing through the filter and light from the reference light source after passing through the filter and the reference gas cell. In another embodiment, one photodetector is used to receive light from the input optical signal after passing through the filter and another is used to receive light from the reference light source after passing through the filter and the reference gas cell.

A method of measuring characteristics of an optical signal in accordance with the present invention includes directing at least a portion of the optical signal to a tunable bandpass optical filter, filtering the optical signal with the tunable bandpass optical filter, providing a reference optical beam having components within a bandwidth wider than the wavelength passband of the tunable bandpass optical filter, passing the reference optical beam through a reference gas cell and the tunable filter to produce a reference optical signal modulated by absorption by the reference gas and detecting the reference optical signal and the filtered optical signal.

A wavelength division multiplexed optical communication system according to the present invention includes a transmitter, an optical transmission line in communication with the transmitter, an optical channel monitor in optical communication with the optical transmission line and including an optical input, a tunable optical bandpass filter in optical communication with the optical input, a photodetector in optical communication with the optical input, a reference light source in optical communication with the tunable optical bandpass filter and configured and arranged to produce a reference light beam having a bandwidth greater that a passband width of the tunable optical bandpass filter and a reference gas call containing a reference gas having a plurality of known absorption wavelength bands and disposed to receive the reference light beam after the reference light beam passes through the filter, and a receiver in optical communication with the transmission line.

DETAILED DESCRIPTION

In the following description, for purposes of explanation and not limitation, specific details are set forth such as particular optical and electrical circuits, circuit components, techniques, etc. in order to facilitate a thorough understanding of the present invention. However, the invention may be practiced in other embodiments that depart from these specific details. The terms optical and light are used in a broad sense in this description to include both visible and non-visible regions of the electromagnetic spectrum. Currently, infrared light is used extensively in transmitting signals in optical communications systems. Infrared light is included within the broad meaning of the term light as used herein.

Figure 1:
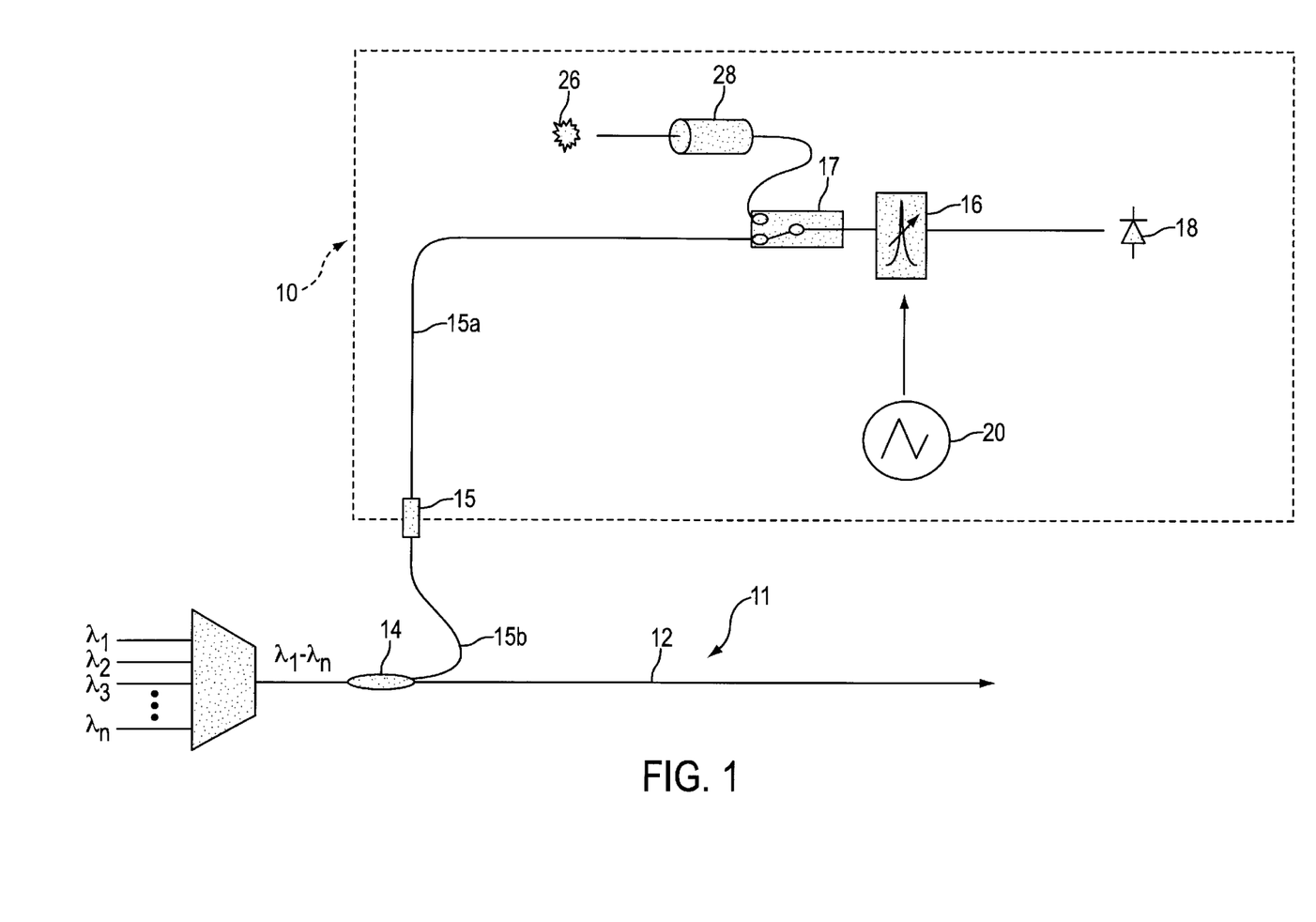
FIG. 1 is a schematic representation of an optical channel monitor according to an embodiment of the present invention.

FIG. 1, shows a device that includes an optical channel monitor 10 according to an embodiment of the present invention. The optical channel monitor 10 is in optical communication with an optical communication system 14 that is adapted to carry optical signals modulated on a carrier of at least one carrier wavelength. More generally, the optical communication system 11 transmits a plurality of channels $ch_1 \ldots ch_n$ at corresponding wavelengths $\lambda_1 \ldots \lambda_n$ which are combined to form the WDM optical signal. Though in practice a channel will generally have a width, and thus occupy a wavelength range rather than a specific wavelength, for the purposes of this description, each channel will be referred to in terms of a single wavelength. The wavelength of a channel may be considered to be a central wavelength of a range, or any selected wavelength within the range occupied by the channel.

The optical communication system 11 has an optical fiber 12, that carries the WDM signal, which in long-haul WDM systems will generally be a single mode optical fiber. A coupler 14 redirects a portion of the energy from the optical fiber 12 into the optical channel monitor 10 through optical input 15 to provide an input optical signal of the optical channel monitor 10.

A tap coupler or splitter are suitable to use for the coupler 14. The inventors have found diverting 1%–5% of the signal is adequate, though more, or less, light may be diverted if desired.

The optical channel monitor 10 has an optical path 15a between the optical input 15 and a bandpass optical filter 16 that is intercepted by a switch 17. An optical fiber having an end spliced to another optical fiber 15b is suitable for providing a light input 15 and an optical path 15a to the bandpass optical filter 16 through switch 17. Other optical paths 15a and optical inputs 15 may include non-fiber waveguides or free space arrangemnets of optical components such as mirrors and/or prisms and lenses.

The bandpass filter 16 allows a selected wavelength band from the input optical signal to pass through. In this embodiment the bandpass filter 16 is a scanning tunable optical filter. For example, a scanning Fabry-Perot filter is suitable. The filtered input optical signal is detected by a photodetector 18.

The tunable optical bandpass filter 16 may be tuned by providing an electromechanical system to vary the spacing between the reflecting surfaces of a Fabry-Perot resonator. The pass band of the optical bandpass filter 16 is scanned over a wavelength range of interest, for example, over a range of frequencies that spans all anticipated optical wavelength channels used by the optical communication system 11

Within the total wavelength range over which the passband of the filter 16 is scanned there may be several wavelength bands which do not overlap with any of the channels $ch_1$ to $ch_n$. Likewise, there may be one or more of the channels which is not active at a given moment. In either case, the photodetector 18 will have a low voltage output signal, indicating no light is detected.

When the bandpass filter 16 is tuned to a wavelength band that overlaps with an active channel, that is a wavelength band in which a signal is present, the photodetector 18 will produce an output signal indicating the strength of the light detected. As the filter is scanned across a wavelength range, the photodetector output will indicate a peak at the wavelength of the active channel.

One method of scanning the optical filter 16 across wavelengths is to provide a triangle wave oscillator 20 or a ramp voltage source which produces a control signal. As the voltage of the control signal is increased, the wavelength passed by the filter also increases. Other methods of scanning are within the scope and spirit of the present invention.

Moreover, the filter 16 need not necessarily be a scanning filter. Any tunable filter may be employed, provided it can be set to pass a single channel at a given time. Likewise, an array of fixed filters could be employed rather than a tunable filter or a scanning filter. A wavelength range of interest is about 1525 nm to about 1565 nm, due to its current importance in existing optical communications systems. However, the broader scope of the invention is not limited to such a range of wavelengths.

In order to ensure that only a single channel is monitored at a time, the passband width of the filter 16 should be more narrow than the bandwidth between channels and broad enough to detect a full channel. At current levels of system performance, a bandwidth of about 20 pm to about 200 pm is appropriate. As systems become more densely packed with channels, the bandwidth of the filter 16 should be selected accordingly.

Figure 2:
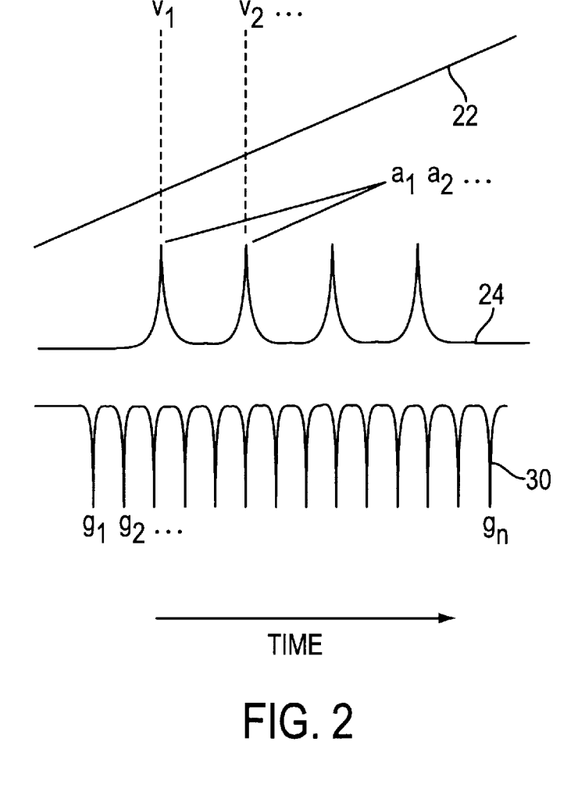
FIG. 2 is a trace showing an example of an output signal of an optical channel monitor according to the embodiment of FIG. 1.

The two top traces 22, 24 shown in FIG. 2 illustrate the relationship between the drive voltage 22 of the scanning Fabry-Perot filter 16 and the photodetector response 24 to the filtered input optical signal. The measured values of drive voltage versus photodetector measurements of the filtered input optical signal together can be used to generate a curve indicating the relative wavelengths of detected channels. Further, information about the relative power of each channel can be extracted. In the example traces 22, 24 of FIG. 2, each peak is of equal amplitude (voltage). In practice, the amplitudes will tend to vary, and their relative values are indicative of optical power carried on that channel. In addition, measuring the voltages near the corresponding peaks permits one to determine optical signal-to-noise ratio for each channel.

The drive voltage and filtered input optical signal voltage alone however, fail to provide any calibration, so that the relative measurements do not provide sufficient information about the absolute wavelength of the measured channel frequencies.

In order to provide a calibration for the photodetector 18 output, a reference source 26 is used. As one can see in FIG. 1, the reference optical source 26 illuminates a reference gas cell 28. The reference optical source provides a broadband optical reference beam of light. The term broadband means that it is at least as broad as the wavelength range of interest, $\lambda_1 \ldots \lambda_n$ in order to ensure that all channels within that range can be calibrated. The switch 17 can be used to change over between measurements of the input optical signal and calibration measurements.

The light from the broadband source 26 is transmitted through the reference gas cell 28. The reference gas cell 28 contains a gas having a plurality of absorption bands or absorption lines each having a known wavelength $g_1 \ldots g_m$. At each absorption line, the reference signal is attenuated as the reference gas absorbs light energy from the reference signal. Examples of appropriate reference gases include hydrogen cyanide or acetylene. However, the gas selected may be any gas having several, closely spaced absorption lines.

After the reference light beam passes through the reference gas cell 28, it reaches the filter 16. As with the input signal, the filter 16 is scanned through the wavelength range and the resulting filtered reference light is detected by the photodetector 18. The photodetector 18 outputs a voltage that is used to produce a reference trace which is correlated to the control voltage, just as was done with the input optical signal. The bottom trace 30 of FIG. 2 shows such a reference trace.

The output from the photodetector 18 from a calibration run provides a scale to determine the absolute wavelengths as long as little time passes between the calibration and measurement runs. That is, for a given control voltage, the wavelength of light measured during monitoring of the optical signal from the transmission line 12 should be substantially the same as the wavelength of light measured from the reference source 26.

One can use the data points determined from the measurement of the reference signal and the known reference gas absorption line wavelengths to generate a voltage to wavelength calibration curve for the filter 16 by correlating control voltage of the filter 16 to passband wavelength. Since each detected peak corresponds to the wavelength of a known absorption line, each peak's absolute wavelength is determined. Data from the input optical signal may then be matched against the calibration curve, showing the wavelengths of the detected channels. That is, the relative measurements made of the detected channels may be converted to absolute measurements by comparison to the calibration curve. The absorption line wavelengths are substantially independent of ambient temperature variations. On the other hand, the measured voltages are typically neither linearly dependent on wavelength, nor constant in time. Therefore, correlating a calibration trace with a measurement trace permits one to obtain absolute wavelength measurement, independent of time and temperature. The calibration cycles may be repeated as deemed necessary, based on the desired accuracy and the particular drift characteristics of the tunable optical bandpass filter and the photodetector 18.

As may be apparent, no actual generation of a calibration curve is necessary. Instead, a wavelength of each measured channel can be determined relative to the measured voltages of the reference gas absorption lines.

For example, $v_1$ indicated in the control voltage trace 22 correlates to a position $a_1$ in the photodetector trace 24. The peak at $a_1$ indicates that an active channel is present in the input signal at a wavelength which corresponds to the passband of the band pass filter at the voltage $v_1$. The voltage $v_1$ likewise corresponds to approximately $g_3$, a position of one of the absorption lines of the reference gas. Since the absorption lines of the gas are already known, the wavelength to which $v_1$ correlates may be determined relative to absorption line $g_3$, or by the interpolation if it is between absorption lines. If there are sufficient absorption lines in the relevant wavelength range, the measured channel wavelengths may be determined to a sufficient resolution without the use of any calibration curve.

Generation of a calibration curve could be accomplished, for example, by a piecewise continuous linear curve between the known points $v_1, g_1 \ldots v_n, g_n$, by calculation of a best fit curve, or other selected methods.

Since the absorption properties of the reference gas are relatively independent of temperature and other physical parameters (such as strain on the optical fiber connecting the reference gas cell with the rest of the system), the measurement can be quite reliable.

In the case of a scanning Fabry-Perot filter, the voltage response of the filter 16 will tend to vary with time and is not generally linear with voltage. As a result, it is beneficial to produce new calibration curves periodically rather than relying on a single, one-time calibration measurement. Re-calibration may be performed as required or desired, depending on accuracy requirements and drift characteristics of the filter 16.

Another possibility, which may be available depending on device response times and switching speeds, is to alternately sample from the reference source 26 and the input optical signal. By rapidly switching the switch 29, the calibration curve may be generated simultaneously with the generation of the measurement curve.

If desired, signal-to-noise ratios for each channel may be determined by measuring baseline voltages in a region near the base of each peak.

Figure 3:
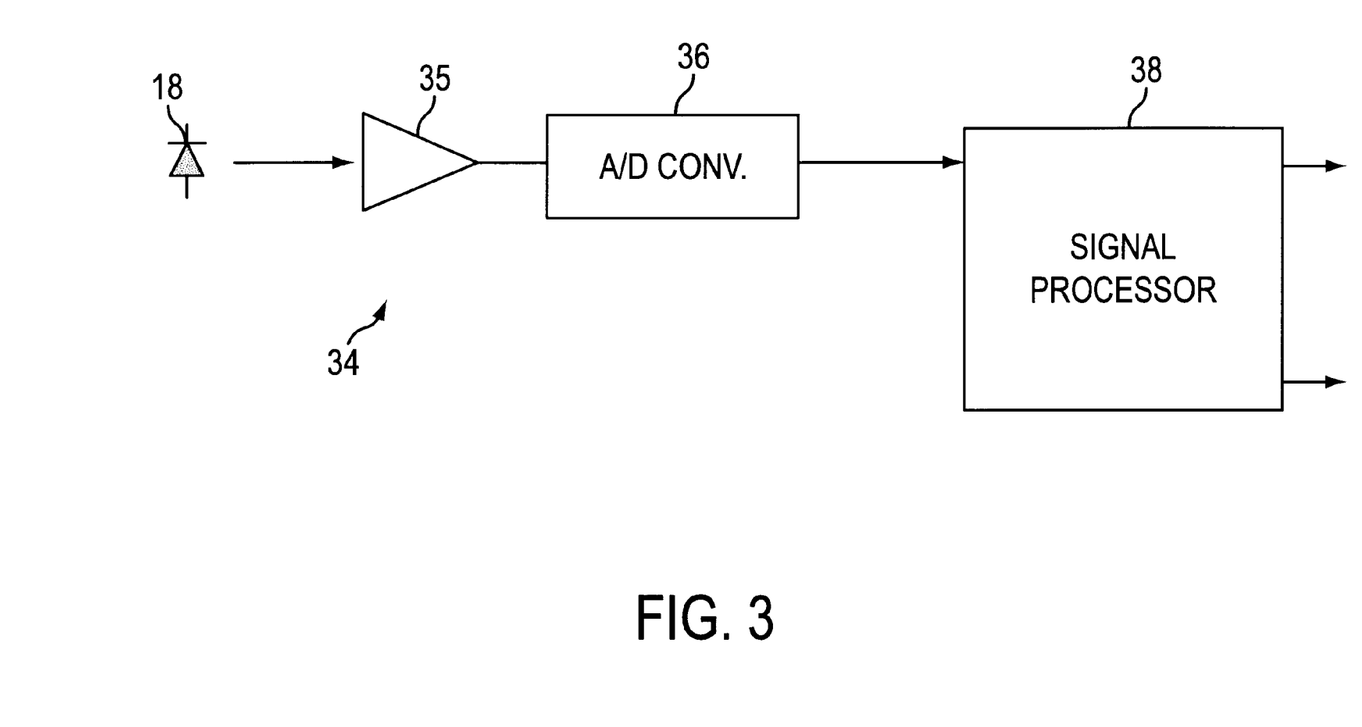
FIG. 3 is a schematic representation of a signal processing circuit adapted for use with the embodiment of FIG. 1.

In FIG. 3, a signal processing circuit 34 for use with an optical channel monitor 10 according to the present invention is shown schematically. The signal processing circuit 34 has an amplifier 35 that receives an electrical signal from the photodetector 18, an analog-to-digital converter 36 that receives the amplified electrical signal from the amplifier 35 and a signal processing unit 38. The output of the photodetector 18 is converted to a digital signal by the analog to digital converter 36 and is passed to a signal processor 38 which may be a microprocessor programmed with instructions for calculating the measured channel wavelengths based on the calibration data. The signal processor 38 may be programmable or it may perform a fixed set of instructions that are pre-programmed or "hard-wired" into it. Likewise, the signal processor 38 may be a filter, or other type of processor which re-shapes the data prior to processing by a separate microprocessor. In the case that the photodetector 18 is a digital device, the digital-to-analog converter 36 may be omitted. Similarly, if there is a desire to perform the signal processing in an analog device, an analog-to-digital converter could be used to convert output from a digital photodetector.

Figure 4:
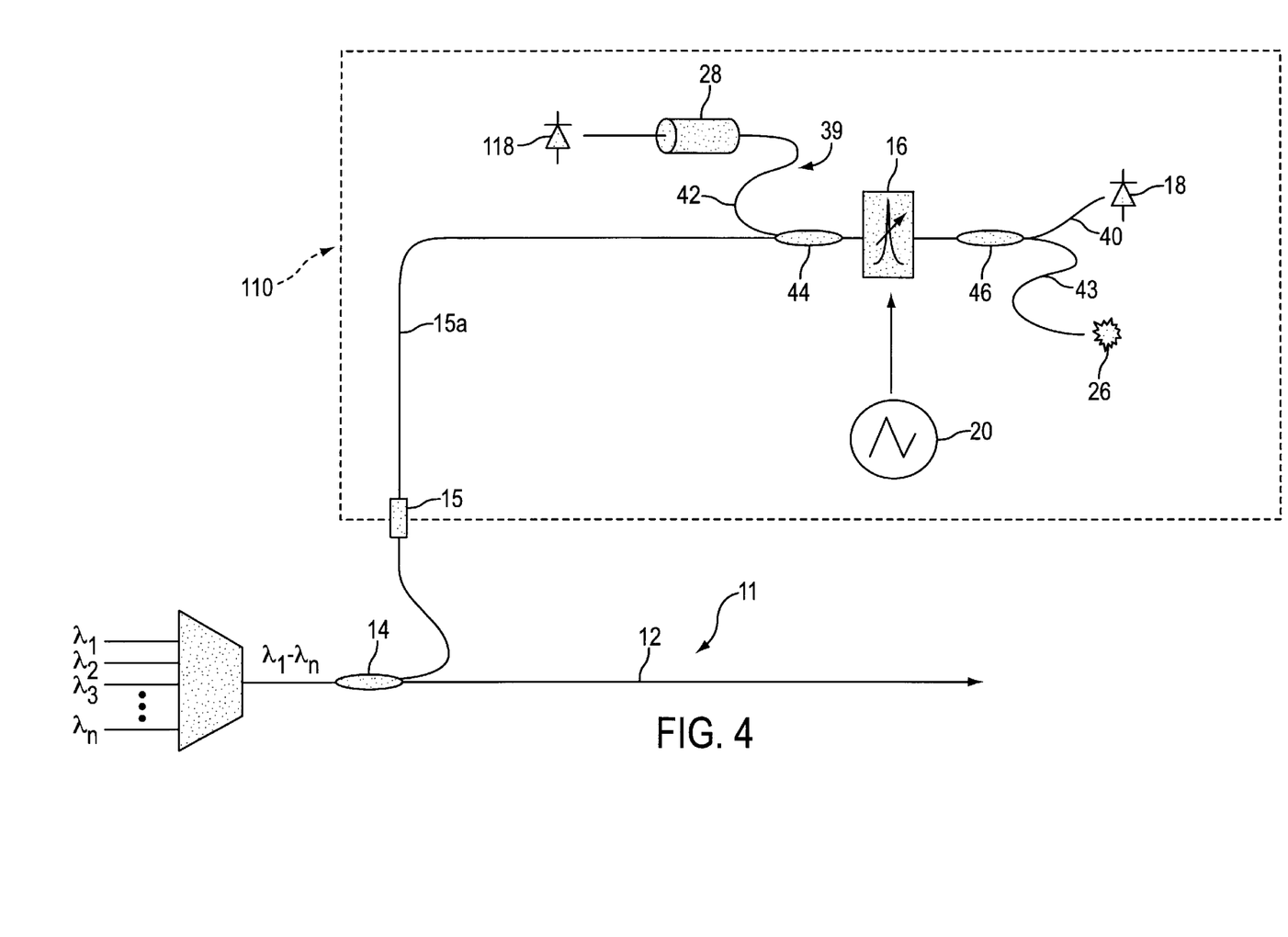
FIG. 4 is a schematic representation of an optical channel monitor according to a second embodiment of the present invention.

A device according to another embodiment of the present invention is illustrated in FIG. 4. An optical channel monitor 110 according to this embodiment is in optical communication with an optical communication system 11, as described above, in relation to a first embodiment of this invention. As in the device of FIG. 1, a plurality of optical signals having wavelengths $\lambda_1 \ldots \lambda_n$ are combined to form an optical signal including a plurality of channels $ch_1 \ldots ch_n$.

The optical communication system 11 has an optical fiber 12 through which the combined optical signal is transmitted. A coupler 14 redirects a portion of the energy from the optical fiber 12 into the optical channel monitor 110. The optical channel monitor 110 has an optical path 15a, which is as described in reference to the first embodiment above, between the optical input 15 and a bandpass optical filter 16. A coupler 44 optically connects the bandpass optical filter 16 with a reference detection arm 42. The reference detection arm 42 includes the reference gas cell 28 and a photodetector 118.

On the opposite side of the bandpass optical filter 16, another coupler 46 optically connects the bandpass optical filter 16 with a detection arm 40, which includes a photodetector 18, and with a reference input arm 43 which is in optical communication with a reference light source 26.

The bandpass optical filter 16 allows a selected wavelength band from the optical signal to pass through to be detected by the photodetector 18. As with the device shown in FIG. 1, the bandpass optical filter 16 may be tuned, for example, by the application of a control signal, which may be, for example, a ramp or triangle wave, such as is produced by the oscillator 20

The reference light from the broadband optical source 26 passes through the filter 16 simultaneous with the input optical signal, but traveling in the opposite direction. At a given time, therefore, the reference light and the input signal will be traveling in either direction from the filter, one nominally from the input and towards the photodetector 18 and the other nominally from the reference source towards the reference gas cell 28 and the reference photodetector 118.

Since each of the two signals passes through the filter 16 simultaneously, only those components of each which lie within the passband of the filter 16 at that instant will pass through. As a result, the photodetector 18 and the reference photodetector 118 should receive optical signals having identical wavelengths at each instant. Prior to detection at the reference photodetector 118, the reference light passes through the reference gas cell 28, where it is attenuated if it is at a wavelength corresponding to an absorption line of the reference gas. Note that the optical path lengths of each detection arm 40, 42 of the monitor 110 should be matched in order to ensure that measurements can be correlated to each other.

While the monitor as shown in FIG. 4 uses 1×2 couplers 44, 46 to split the signals into the appropriate paths, circulators could also be used, to reduce effects of reflections which might otherwise propagate back to the transmission line. For example, the input side coupler 44 could be replaced with a counter-clockwise circulator which transmits signals from the first (input) port to a second (output on the filter side) port and from the second to a third (output on the reference gas cell and photodetector side) port. As a result, the reference light passing from the filter 16 towards the monitor input side of the device would not be carried back to the tap coupler 14 and into the transmission line 12. Likewise, the output side coupler 46 could be replaced with a clockwise circulator such that signals from the filter 16 pass to the photodetector 18 and signals from the reference source 26 pass to the filter 16 substantially without being coupled back to the photodetector 18 to interfere with its measurements.

Figure 5:
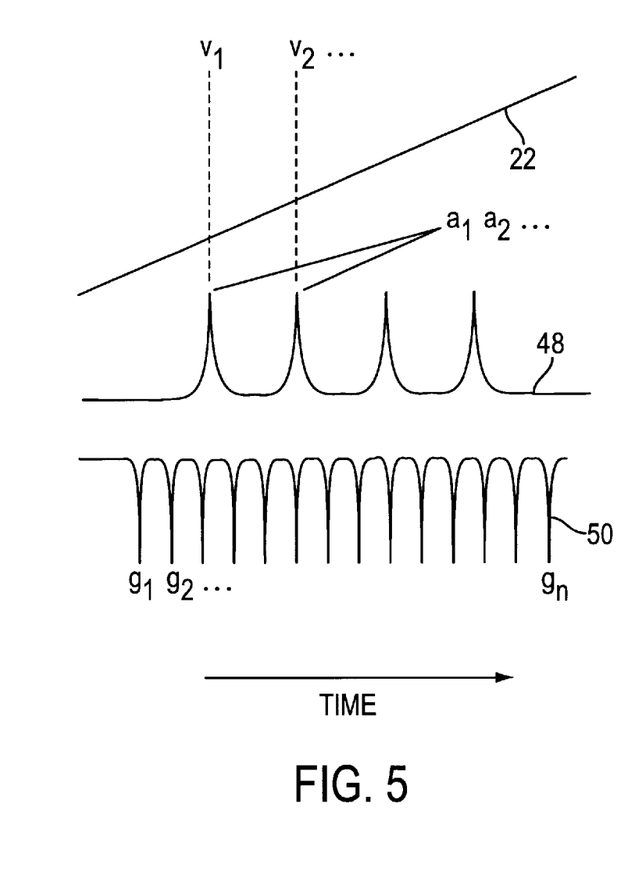
FIG. 5 is a trace showing an example of an output signal of an optical channel monitor according to the embodiment of FIG. 4.

The traces shown in FIG. 5 are similar to those shown in FIG. 2. One difference is that the input signal trace 48 represents output from the photodetector 18 and the reference trace 50 represents output from the reference photodetector 118. In contrast, each trace 48 would represent output from a single photodetector 18 in the device shown in FIG. 1. The data, however, may be interpreted in a similar fashion to that used for interpretation of the data shown in FIG. 2.

Figure 6:
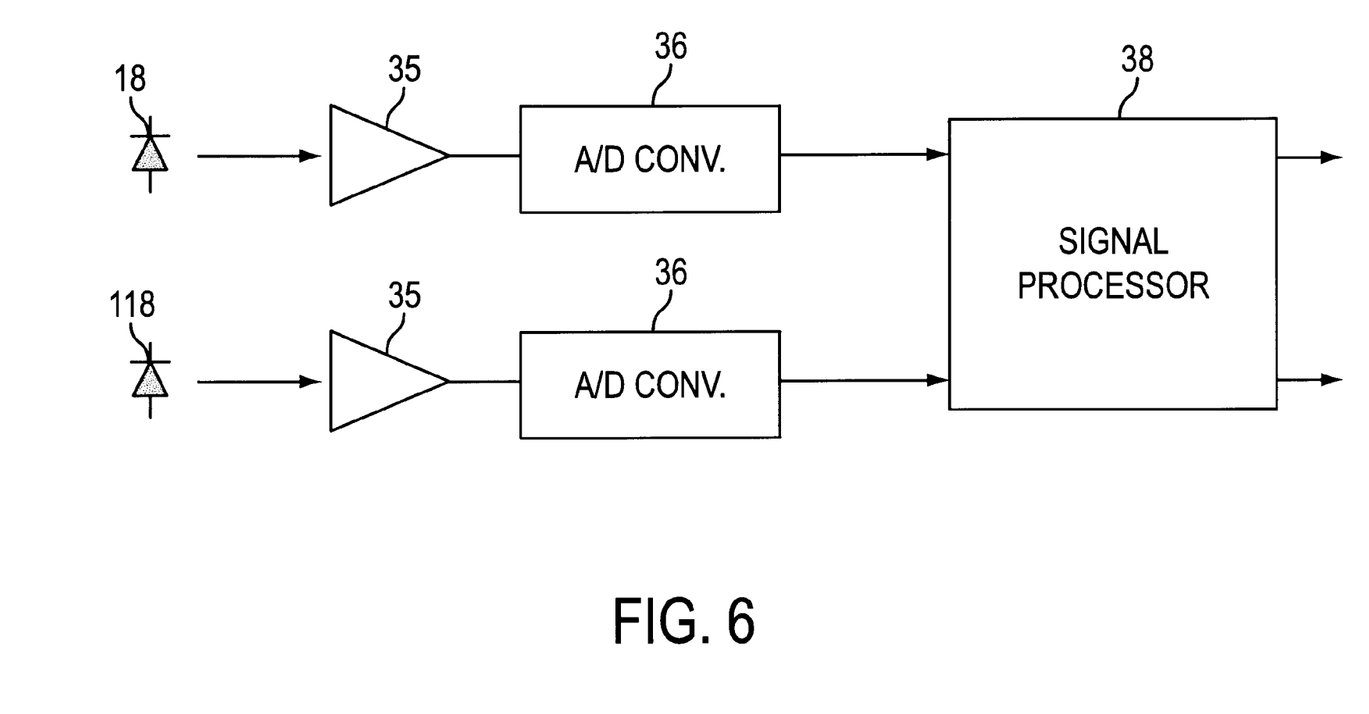
FIG. 6 is a schematic representation of a signal processing circuit adapted for use with the embodiment of FIG. 4.

Similarly, the signal processing circuitry shown in FIG. 6 may be understood as operating in much the same way as that shown in FIG. 3. Separate amplifiers 35 and analog-to-digital converters 36 accept respective output signals from each photodetector 18, 118, but otherwise the systems can be configured identically. Not shown, but optionally available for the signal processors 34 of both FIGS. 3 and 6 is an input to the signal processor 34 allowing the filter 16 control signal voltage to be processed along with the detector 18, 118 output.

Figure 7:
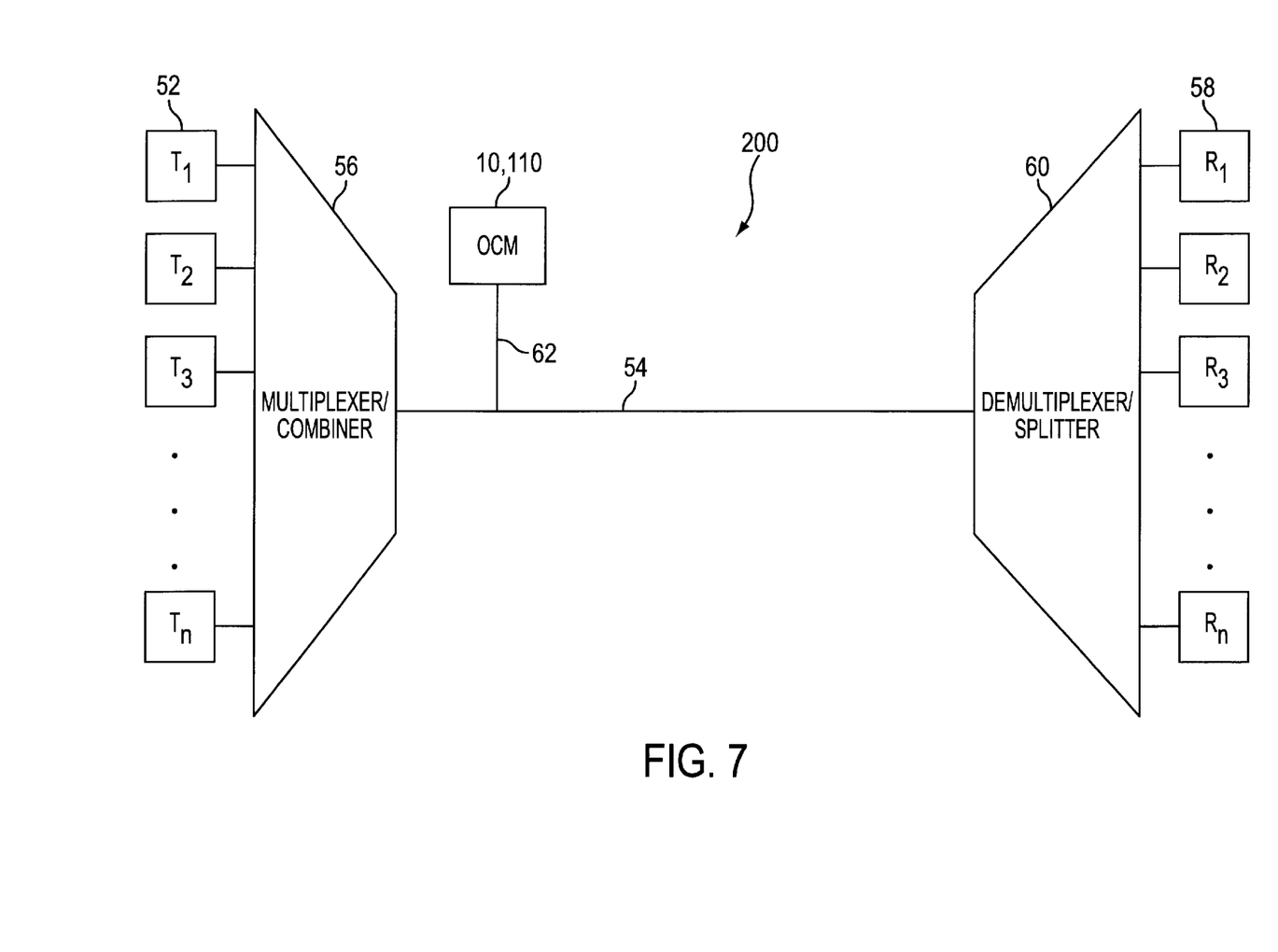
FIG. 7 is a schematic representation of an optical communication system incorporating an optical channel monitor according to an embodiment of the present invention.
Figure 8:
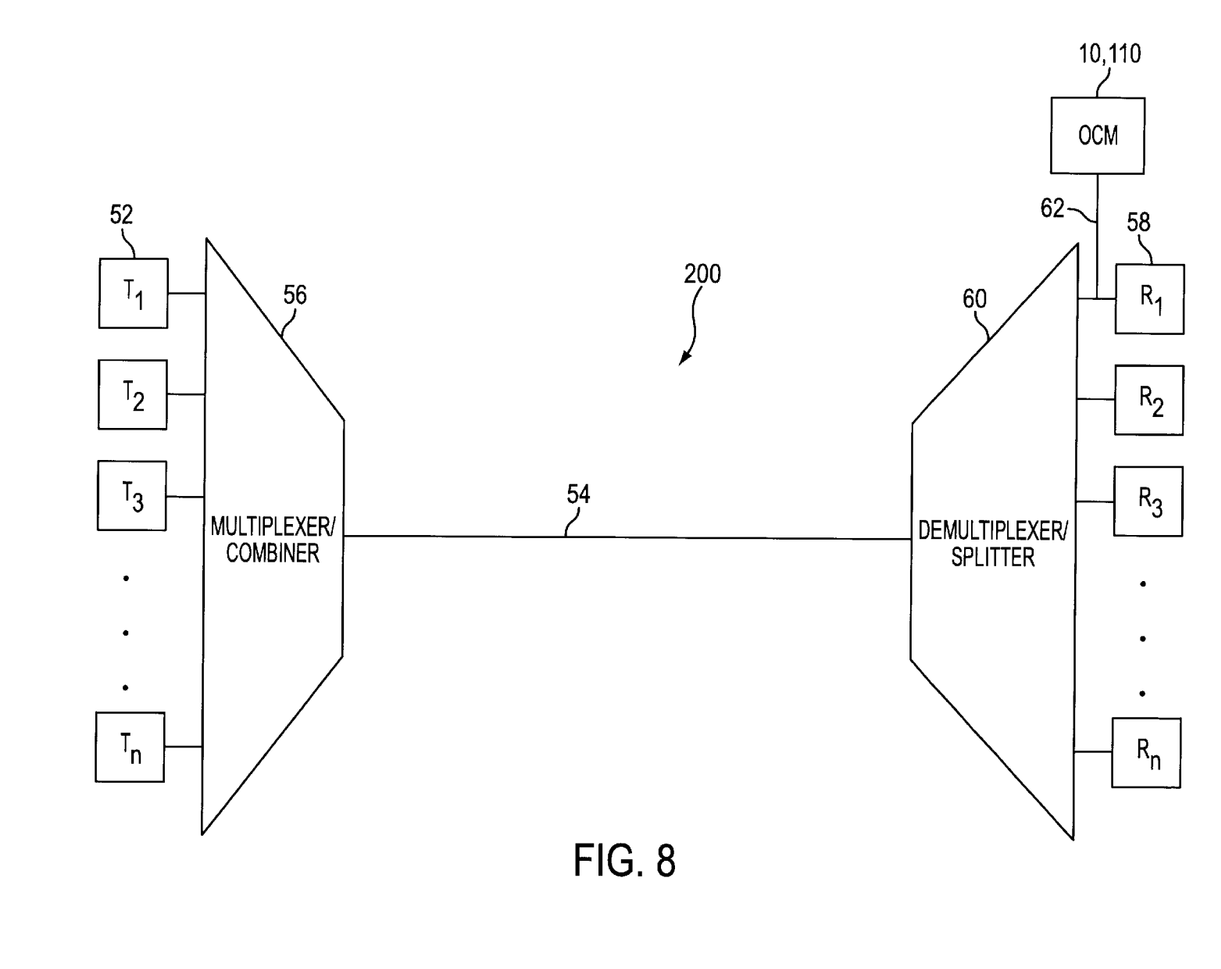
FIG. 8 is a schematic representation of an optical communication system incorporating an optical channel monitor according to another embodiment of the present invention.

FIG. 7 shows generally an optical communication system 200 incorporating an optical channel monitor 10, 110 according to the present invention. A transmitter 52, which may be understood to be alternately a single transmitter, an array of transmitters or a tunable transmitting arrangement, produces an optical signal which is coupled into an optical transmission line 54. A multiplexer or combiner 56 may be used to couple signals from multiple transmitters 52 into a single optical transmission line 54. The optical signal includes at least one channel and will commonly include several channels. A receiver 58 is also in optical communication with the transmission line 54 and receives the optical signal. A splitter, demultiplexer or channel selector 60 may be used to couple the optical signal into the receiver 58 from the transmission line 54.

An optical input 62 of the optical channel monitor 10, 110 is in communication with the transmission line 54. The optical input 62 may be any device for coupling a portion of the transmitted optical signal into the optical channel monitor 10, 110. The optical channel monitor 10, 110, as described above, includes a tunable optical bandpass filter 16 in communication with the optical input 62. A photodetector 18, reference light source 26, and a reference gas cell 28 are included in the channel monitor 10, 110 to allow monitoring of the optical signal and calibration of the monitoring as described above. A reference photodetector 118 could also be provided, in accordance with the second described embodiment of the invention.

The optical channel monitors 10, 110 can be used in a variety of ways in accordance with this aspect of the invention.

In a first usage, as shown in FIG. 7, a channel monitor 10, 110 receives light from a transmitter in order to monitor the transmitted channels in the communication system 200. Though shown coupled to the transmission line 54, the channel monitor 10, 110 may similarly be coupled to the transmitter prior to the multiplexer 56. Alternately, the channel monitor 10, 110 receives light prior to a receiver 58 to monitor incoming light. For instance, in a system using channel selectors to send only a single channel to the receiver 58, the channel monitor 10, 110 is used to ensure that the channel selector maintains its proper tuning such that the appropriate channel is selected.

Though the invention has been described in terms of multiple channels being transmitted along a single fiber, one skilled in the art will realize that it has application in systems in which only a single channel is transmitted on the fiber. Likewise, though the invention has been described in the context of 1550 nm transmission systems, it maybe applied to 1310 nm systems, for example, or other selected wavelength systems.

While the invention has been described in connection with particular embodiments, it is to be understood that the invention is not limited to the disclosed embodiments, but on the contrary it is intended to cover various modifications and equivalent arrangement included within the spirit and scope of the claims which follow.

What is claimed is:

1. An optical channel monitor, comprising:
   a tunable optical bandpass filter in optical communication with an optical input;
   a photodetector in optical communication with the optical input;
   a reference light source in optical communication with the tunable optical bandpass filter, said reference light source configured and arranged to produce a reference light beam having a bandwidth greater than a passband width of the tunable optical bandpass filter; and
   a reference gas cell containing a reference gas having a plurality of known absorption wavelength bands, the reference gas cell being constructed and arranged to receive at least a portion of the reference light beam after the reference light beam passes through the filter.

2. An optical channel monitor as in claim 1, further comprising a reference photodetector, disposed in an optical path of the reference light beam after it has passed through both the filter and the reference gas cell.

3. An optical channel monitor as in claim 2, further comprising a signal processor in electrical communication with the photodetector and the reference photodetector.

4. An optical channel monitor as in claim 3, further comprising an amplifier in electrical communication with the photodetectors and the signal processor.

5. An optical channel monitor as in claim 4, further comprising an analog-to-digital converter in series electrical communication with the amplifier and the signal processor.

6. An optical channel monitor as in claim 1, wherein the photodetector is disposed in an optical path of the reference signal after it has passed through both the filter and the reference cell.

7. An optical channel monitor as in claim 1, wherein the tunable optical bandpass filter comprises a scanning Fabry-Perot filter.

8. An optical channel monitor as in claim 1, wherein the tunable optical bandpass filter is tunable in response to an electrical signal from an electrical signal generator.

9. An optical channel monitor as in claim 8, wherein the electrical signal generator is a triangle wave oscillator.

10. An optical channel monitor as in claim 9, wherein the tunable optical filter comprises a scanning Fabry-Perot filter.

11. An optical channel monitor as in claim 10, wherein the scanning Fabry-Perot filter is constructed and arranged to pass a plurality of wavelength bands, in order, in response to the electrical signal such that a predetermined wavelength range is continuously scanned.

12. An optical channel monitor as in claim 1, further comprising a signal processor in electrical communication with the photodetector.

13. An optical channel monitor as in claim 12, further comprising an amplifier in electrical communication with the photodetector and the signal processor.

14. An optical channel monitor as in claim 13, further comprising an analog-to-digital converter, in series electrical communication with the amplifier and the signal processor.

15. A method of measuring characteristics of an optical signal, comprising:
   directing at least a portion of the optical signal to a tunable bandpass optical filter having a wavelength passband;
   filtering the optical signal with the tunable bandpass optical filter, the filtering producing a filtered optical signal;
   providing a reference optical beam having components within a bandwidth wider than the wavelength passband of the tunable bandpass optical filter;
   passing the reference optical beam through a reference gas cell having a reference gas and the tunable filter to produce a reference optical signal modulated by absorption by the reference gas; and
   detecting the filtered optical signal and the reference optical signal.

16. A method as in claim 15, further comprising, comparing the filtered optical signal with the reference optical signal.

17. A method as in claim 15, wherein the filtered optical signal and the reference optical signal are detected with respective photodetectors.

18. A method as in claim 15, wherein the filtered optical signal and the reference optical signal are detected with a common photodetector.

19. A method as in claim 15, further comprising processing the optical signals.

20. A method as in claim 19, wherein the processing further comprises:
   amplifying the filtered optical signal and the reference optical signal;
   converting the filtered optical signal and the reference optical signal to respective digital signals; and
   processing the digital signals.

21. A wavelength division multiplexed optical communication system, comprising:

a transmitter;

an optical transmission line in communication with the transmitter to receive an optical signal including at least one channel, the channel comprising a selected wavelength bandwidth;

an optical channel monitor comprising:

an optical input in optical communication with the optical transmission line;

a tunable optical bandpass filter in optical communication with the optical input;

a photodetector in optical communication with the optical input;

a reference light source in optical communication with the tunable optical bandpass filter, said reference light source configured and arranged to produce a reference light beam having a bandwidth greater than a passband width of the tunable optical bandpass filter; and a reference gas cell containing a reference gas having a plurality of known absorption wavelength bands, the reference gas cell being constructed and arranged to receive at least a portion of the reference light beam after the reference signal passes through the filter; and a receiver in communication with the optical transmission line.

* * * * *